Jan. 7, 1947.　　　J. C. HONHART ET AL　　　2,414,043
VARIABLE RESISTANCE WELDING ELECTRODE HOLDER
Filed May 31, 1943

INVENTORS.
Jack C. Honhart,
Earle W. Bagg.
BY

Patented Jan. 7, 1947

2,414,043

UNITED STATES PATENT OFFICE 2,414,043

VARIABLE RESISTANCE WELDING ELECTRODE HOLDER

Jack C. Honhart, Detroit, and Earle W. Bagg, Harsens Island, Mich.

Application May 31, 1943, Serial No. 489,166

1 Claim. (Cl. 201—48)

This invention relates to electrode holders for use in electric welding operations and more particularly to an electrode holder having manually operable means carried by the holder for varying the intensity of the welding current.

In the operation of commercial electric welding apparatus it is desirable to vary the intensity of the welding current to compensate for irregularities in density, electrical conducting characteristics, mass of the work and other variables. Heretofore this variation of the welding current has been accomplished by means of a control member positioned adjacent the source of the electric welding current or interposed between the source of current and a welding electrode holder. This control member being positioned at a distance from the electrode holder could not be readily manipulated to vary the welding current while the welding operation progressed because it was positioned at a point spaced from the manually actuated electrode holder.

An object of this invention is to provide an electrode holder having manually operable means carried by the holder whereby the intensity of the welding current can be readily varied while the welding operation is in progress.

A further object of the invention resides in the provision of an electrode holder having a manually controlled variable resistance unit whereby the intensity of the welding current may be changed while the welding operation progresses.

Another object is to provide a manually controlled variable resistance unit which may be connected to a standard welding electrode holder whereby the intensity of the welding current may be readily varied by the welder without releasing the electrode holder.

Yet a further object of the invention resides in the provision of a manual control for a welding electrode holder, so constructed and arranged that when the electrode holder is released the welding current is interrupted or reduced.

Still another object of the invention is to provide an improved manually actuated resistance unit for varying the intensity or speed of operation of electrically actuated devices.

A further object resides in the provision of a variable electrical resistance unit having a manually controlled member for progressively varying the intensity of electric current supplied to an electrically actuated device, wherein manually actuated means are provided to maintain any predetermined electrical output.

Yet another object is to provide an improved variable resistance unit having a manually actuated control member operable by a rolling or rocking contact on spaced resistance members to progressively vary the current supplied to an electrically actuated device.

Other objects and advantages of this invention will be apparent from the following detailed description considered in connection with the accompanying drawing, submitted for purposes of illustration only and not intended to define the scope of the invention, reference being had for that purpose to the subjoined claim.

In the drawing wherein similar reference characters refer to similar parts throughout the several views.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
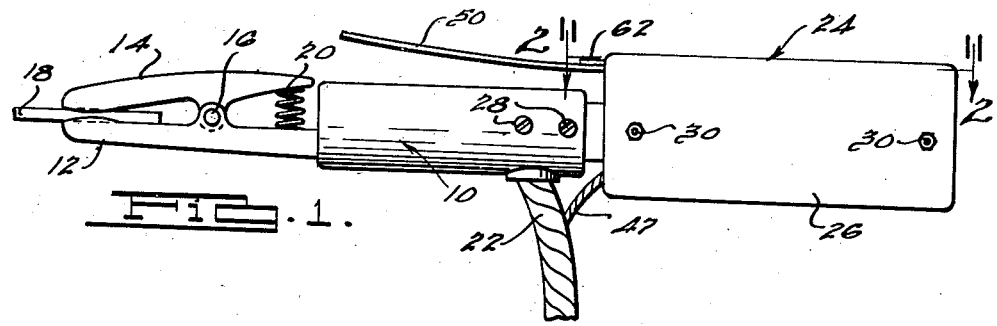
Fig. 1 is a side elevation of an electrode holder having a manually actuated unit for varying the welding current embodying the present invention.
Figure 2:
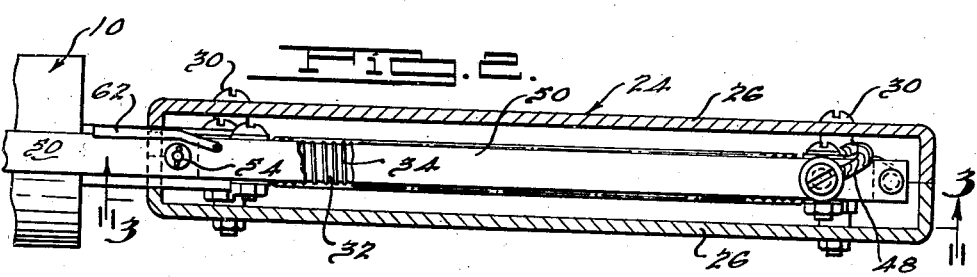
Fig. 2 is an enlarged fragmentary sectional view taken substantially on the line 2—2 of Fig. 1 looking in the direction of the arrows.

Referring now more particularly to Fig. 1, 10 represents an electrode holder of any suitable or standard form. The holder 10 is provided with jaws 12 and 14 pivoted together at 16 and adapted to grip and hold a welding electrode 18. Yielding means such as a spring 20 may be provided to urge the jaws 12 and 14 toward gripping engagement with the electrode 18.

In the operation of electrical welding devices, electric current is supplied through an electric conduit 22 to the eletrode holder 10 and welding electrode 18. The welding electrode 18 is positioned in contact with the material to be welded, and the electric circuit is completed by connecting the material to be welded to the other side of the electric circuit. The intensity of the welding current may be varied to produce uniform welding and compensate for variations of the mass, electrical conductivity, heating of the material being welded due to the flow of heat from the point of welding and other factors.

The welding electrical current may be supplied by any suitable electricity producing device such, for example, as a direct current generator. One of the brushes of the generator may be connected to the material to be welded, and the other brush may be connected through the electric conduit 22 with the welding electrode 18. Where a direct current generator is employed as the source of welding electric energy, the intensity of the welding current may be changed by varying the field of the generator by a suitable adjustable rheostat 24.

The rheostat 24 for varying the intensity of the welding current or the output of a welding generator may be housed in a casing 26 suitably attached to the electrode holder 10 in any convenient manner as by means of screws 28 and 30. The rheostat 24 comprises an insulating core 32 formed of any suitable insulating material such for example as mica, a member of the ceramics group such as porcelain, or transite, a composition of Portland cement and asbestos.

A suitable resistance element such, for example, as a wire 34 preferably having high electric resistance characteristics such as "Nicrome" wire formed of nickel having a high chrome content to gain resistance and withstand heat may be wrapped around the insulating core 32.

One end 36 of the wire 34 may be connected through a contact 38 with a wire 40, and the other end 42 of the wire 34 may be connected through a contact 44 with a wire 46. The wires 40 and 46 are positioned in a casing 47 and are connected for example to vary the output from the excitor field controlling the electrical output of the source of electrical energy to vary the intensity of the welding current supplied through the conduit 22 to the welding electrode 18.

Figure 3:
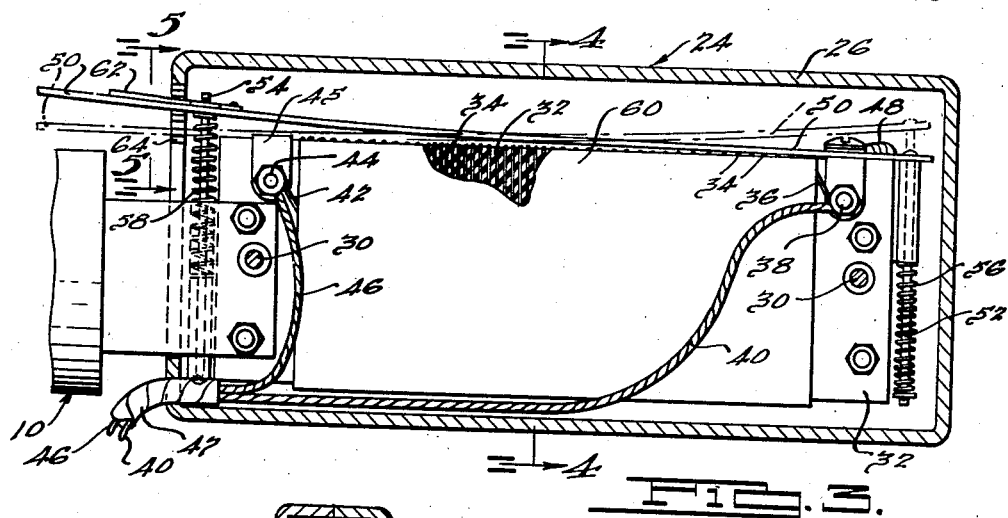
Fig. 3 is a sectional view taken substantially on the line 3—3 of Fig. 2 looking in the direction of the arrows.
Figures 4, 5:
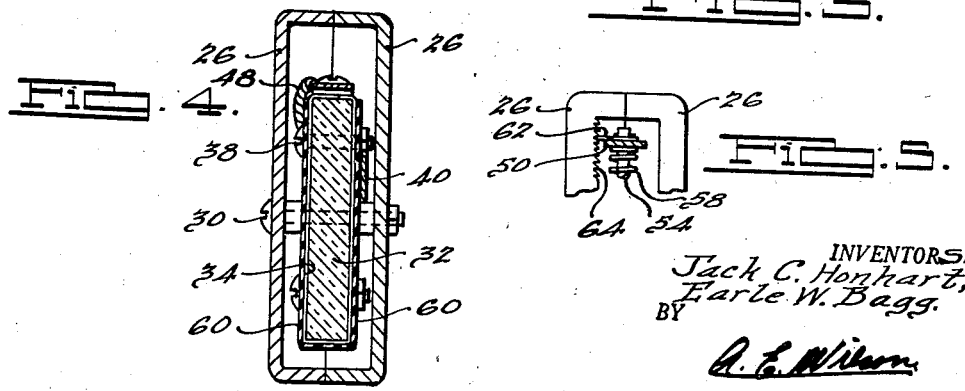
Fig. 4 is a sectional view taken substantially on the line 4—4 of Fig. 3 looking in the direction of the arrows.
Fig. 5 is a fragmentary sectional view taken substantially on the line 5—5 of Fig. 3 looking in the direction of the arrows.

The contact 38 connected to the end 36 of the resistance wire 34 is connected through a flexible connector 48 with a manually controlled lever 50 positioned to successively engage exposed surfaces of the convolutions of the resistance wire 34. The lever 50 is preferably of curved or arcuate shape as illustrated in Fig. 3 and is preferably mounted on spaced pins 52 and 54 positioned beyond the coil of resistance wire 34 wound on the insulator 32. The pins 52 and 54 are preferably provided with oppositely disposed springs 56 and 58 respectively to yieldingly urge the surface of the lever 50 to engage the convolutions of wire 34 adjacent the contact 38 as illustrated in full lines in Fig. 3.

When the lever 50 thus engages the first convolution of the wire 34 adjacent the contact 38, very little electric current flows through the flexible connector 48 to the wire 46, and the welding current supplied by the source of welding current will be correspondingly low. As increased welding current is desired, the lever may be progressively actuated toward the dash-dot position illustrated in Fig. 3, to progressively move the contacting position of the lever 50 toward the left along the convolutions of the wire 34 toward the contact 44. As the contacting portion of the lever 50 is progressively moved along the wire 34 toward the contact 45 progressively increasing current is passed through the flexible connector 48 to the wire 46 controlling the electrical output or the intensity of the welding current. In other words the welding current supplied by the source of electric energy such for example as a main generator is varied by controlling the output of the exciter field by means of the rheostat 24.

It will be apparent that since the contacting surface of the arcuate shaped lever merely rolls on the convolutions of the wire 34, little effort is required to actuate it, and the wire 34 is not subjected to excessive wear or abrasion.

After the wire 34 has been wrapped about the insulating core 32 any suitable sealing or insulating substance 60 such for example as a vitreous enamel may be applied to the core 32 and wire 34 to securely bond the convolutions of wire 34 in place and to maintain them separated from each other. If desired the sealing means may be applied by spraying or dipping the insulating core 32 and wire 34 in the insulating substance and thereafter allowing it to dry or baking it. The surface of the convolutions of the wire 34 may, if desired, be finished by a suitable machining or grinding operation to provide a smooth even surface to insure progressive contact with successive convolutions as the lever 50 is actuated to roll or rock relative to the exposed surfaces of successive convolutions of the wire 34 to vary the current transmitted.

The operation is as follows: When a welding operation is to be performed, one lead from the source of the welding current is connected to the material to be welded. The other lead from the source of welding current is connected to the conduit 22 to direct the welding current through the electrode holder 10 to the welding electrode 18. The electrode 18 is placed in contact with the material to be welded at the point where it is desired to perform the welding operation.

The lever 50 is then actuated to roll or rock the contacting surface of the lever 50 into engagement with successive convolutions of the wire 34 toward the left hand contact 45 to decrease the resistance of the rheostat. This decreased resistance permits greater current to flow through the wires 40 and 46 to increase the welding current supply.

When the desired intensity of the welding current has been attained the lever 50 may be held stationary to continue the supply of the desired welding current. To aid the operator in maintaining the lever 50 in a desired position a catch 62 carried by the lever 50 may be moved into engagement with serrations 64 formed in the edge of the casing 26 to maintain the lever 50 in a desired predetermined position.

If increased or decreased welding current is desired the lever 50 may be actuated by the welder without relinquishing his grip on the electrode holder 10 to provide the desired welding current. It will be apparent that the welding current can be varied while a weld is in progress since it is only necessary to actuate the lever 50 to obtain any desired current.

The rheostat 24 may be attached to any standard electrode holder, and may be so positioned that the operator may actuate the lever 50 with his fingers or thumb as desired. Since the rheostat is small and compact the increase of weight due to the addition of the manually controlled rheostat to the electrode holder 10 is not objectionable.

It will be apparent that if the welder loses his grip on the electrode holder or drops it, the lever 50 is moved by the springs 56 and 58 to the full line position illustrated in Fig. 3 to reduce the welding current supplied to the electrode 18 to a minimum.

If the end 36 of the resistance wire 34 is not connected to the contact 38, and the lever 50 in the inoperative or full line position of Fig. 3 does not engage any of the convolutions of the wire 34, no current will flow through the resistance unit. When applied to an electrode holding device, the current would be completely cut off when the lever 50 is in the full line position illustrated in Fig. 3.

The rheostat 24 may be used for purposes other than to vary the welding current such for example, as to control the speed of a motor, the intensity of lights, the amount of heat developed by a heating system, etc.

We claim:

A rheostat comprising an insulating core having longitudinally straight side walls, an electrical resistance element wrapped about the insulating core and having a plurality of successively spaced convolutions, a substantially inflexible contactor member having a cam shaped portion to engage successively spaced convolutions of the resistance element in rolling contact and an activating handle extending beyond one end of the core, spaced guide receiving member secured to opposite ends of the core, a guide member carried by the contactor at the end remote from the handle to project into the guide receiving member secured to one end of the core, a guide member associated with the guide receiving member secured to the other end of the core and projecting through the contactor member to maintain the contactor in substantially predetermined alignment with the resistance element, oppositely disposed yielding means interposed between each guide member and its associated guide receiving member to urge the contactor member towards a predetermined position relative to the resistance element, and manually operable means to actuate the contactor member.

JACK C. HONHART.
EARLE W. BAGG.